(12) United States Patent
De Keukelaere et al.

(10) Patent No.: US 8,776,239 B2
(45) Date of Patent: Jul. 8, 2014

(54) IN-DEVELOPMENT VULNERABILITY RESPONSE MANAGEMENT

(75) Inventors: Frederik De Keukelaere, Tokyo (JP); Lin Luo, Beijing (CN); Peter K. Malkin, Ardsley, NY (US); Masayoshi Teraguchi, Kanagawa-ken (JP); Naohiko Uramoto, Kanagawa-ken (JP); Shun X. Yang, Beijing (CN); Sachiko Yoshihama, Kanagawa-ken (JP); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 12/787,933

(22) Filed: May 26, 2010

(65) Prior Publication Data

US 2011/0191855 A1   Aug. 4, 2011

(30) Foreign Application Priority Data

Jan. 29, 2010   (CN) .......................... 2010 1 0104980

(51) Int. Cl.
*G06F 11/00* (2006.01)
(52) U.S. Cl.
USPC .......................................... 726/25; 713/188
(58) Field of Classification Search
USPC .......................................... 726/25; 713/188
See application file for complete search history.

(56) References Cited

U.S. PATENT DOCUMENTS

| | | | |
|---|---|---|---|
| 2004/0073764 A1* | 4/2004 | Andreasson | 711/170 |
| 2005/0198527 A1* | 9/2005 | Johnson et al. | 713/200 |
| 2006/0230289 A1* | 10/2006 | Fox et al. | 713/188 |
| 2007/0006314 A1* | 1/2007 | Costa et al. | 726/25 |
| 2008/0115219 A1* | 5/2008 | Kim et al. | 726/25 |

FOREIGN PATENT DOCUMENTS

| | | | |
|---|---|---|---|
| CN | 1725759 A | 1/2006 | |
| CN | 1936862 A | 3/2007 | |

OTHER PUBLICATIONS

IBM Software—Rational Software, AppScan product line, http://www.ibm.com/software/awdtools/appscan/, May 26, 2010.
Fortify Software, http://www.fortify.com/, May 26, 2010.
HP SPI Dynamics, http://www.hp.com/go/securitysoftware, May 26, 2010.
Microsoft Security Development Lifecycle, http://msdn.microsoft.com/en-us/security/cc448177.aspx, May 26, 2010.

* cited by examiner

*Primary Examiner* — Brandon Hoffman
*Assistant Examiner* — Samuel Ambaye
(74) *Attorney, Agent, or Firm* — Scully, Scott, Murphy & Presser, P.C.; Louis J. Percello, Esq.

(57) ABSTRACT

In-development vulnerability response management, in one aspect, may detect a code instance that matches a vulnerability pattern; generate one or more hints associated with the code instance in response to the detecting; retrieve an action response to the code instance that matches a vulnerability pattern; and associate the retrieved action response with the code instance.

22 Claims, 5 Drawing Sheets

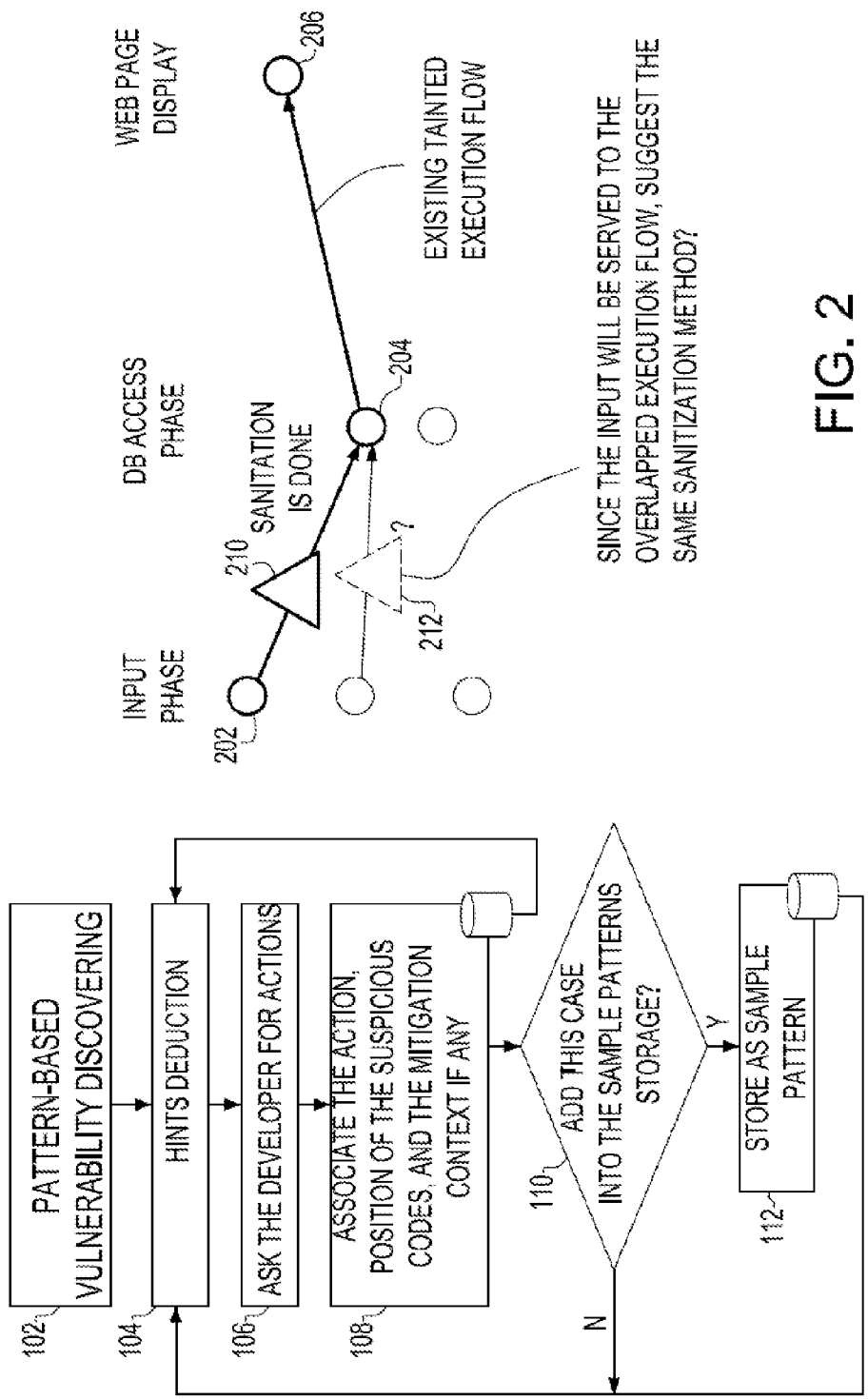

FIG. 4

IN-DEVELOPMENT VULNERABILITY RESPONSE MANAGEMENT

This application claims priority under 35 U.S.C. §119 from Chinese Patent Application No. 201010104980.1 filed Jan. 29, 2010, the entire contents of which are incorporated herein by reference.

FIELD OF THE INVENTION

The present disclosure relates generally to computer systems, and more particularly to detecting and managing vulnerability in program codes in development.

BACKGROUND

Security in computer systems and networks is an ongoing topic. Because system and OS level vulnerabilities are more difficult to exploit, the easier web application-layer has become the main focus of many hackers. For instance, sequential query language (SQL) injection and cross-site scripting (XSS) are considered as few of the top threats. The two security holes discussed above are often avoidable. For example, SQL injection can be prevented if the developers use prepared statements. Additionally, output escaping can effectively strengthen the web applications to defend them against XSS exploits, Microsoft™ has published security development lifecycle (SDL) to help developers on that mechanism.

Several tools and approaches are also available for finding risks in codes. IBM™ Rational™ Appscan™ performs dynamic application security testing by mimicking hacking web applications in order to find security holes. This tool operates on the codes that are built into executable components for the testing, and thus applies to runtime. Others use static code security analysis tools for finding unsafe code patterns (tainted execution flows) during application development, for example, using whitebox or graybox approaches to identify vulnerabilities through code analysis. These static analysis tools can be applied without the completion of building, for example, during the development. The tainted flow detection is relatively more accurate, but even with that, static analysis still cannot accurately judge whether there are existing sanitization processing in the execution flow and how effective it is. Those approaches still have limitations in accuracy, calling for the need for developers' review.

The typical practice observed today for secure development is: use static analysis and dynamic testing tool to find the vulnerabilities, and then generate security ticket into bug control systems such as IBM™ Rational™ ClearCase™ (CC) and IBM™ Rational™ ClearQuest™ (CQ), and let the programmers fix the codes and close the ticket; then wait until the testing phase, and perform the whole security analysis again to find holes.

There may be several limitations of the above practice. Conflict sanitization may exist along the tainted flow and the sanitization could be done in different phases (input phase, database (DB) access phase, or page display phase) to fix the security hole. Usually the responsible developers are not the same for different phases. Suppose two developers are both familiar with security and use HtmlEntity escaping to defend against XSS attacks. Then they may wrongly duplicate escaping—e.g. one escapes '<' to '<' and the data is stored into DB, and later on the other developer retrieves the data from DB and further escapes '<' to '<'. Dynamic testing may find such cases but as mentioned above, it has to wait until code building.

As mentioned above, the hole location and the ideal sanitization codes are usually not co-located. For example, an SQL injection vulnerability happens when user input is directly used to concatenate an SQL query and to access a DB, but sometimes the sanitization location might be in the jsp page accepting the user's input. Therefore it is difficult for a reviewer to correlate the sanitization codes and the security ticket in CQ.

Similar vulnerability patterns occur regularly since rookie developers often may make the same mistakes again. Repeating to fix the similar holes results in the duplicate efforts. In addition, hole mitigation takes more time. For example, performing the security checks and hole mitigations in each testing iteration is less effective than doing it during the development. The latter can help developers judge it more accurately because developers have more knowledge about the structure of the code and the mitigation context. Further, the sanitization code may be changed due to some non-security reasons (method name, functionalities, etc), which means the vulnerability may reoccur, and re-examination of the hole is required.

BRIEF SUMMARY

A method and system for in-development vulnerability response management are provided. The method, in one aspect, may include detecting a code instance that matches a vulnerability pattern and generating one or more hints associated with the code instance in response to the detecting. The method may also include retrieving an action response to the code instance that matches a vulnerability pattern and associating the retrieved action response with the code instance.

A system for in-development vulnerability response management, in one aspect, may include a module operable to detect a code instance that matches a vulnerability pattern. The module may be further operable to generate one or more hints associated with the code instance in response to detecting the code instance that matches a vulnerability pattern. The module may be also operable to retrieve an action response to the code instance that matches a vulnerability pattern, and associate the retrieved action response with the code instance.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 1 is a flow diagram illustrating a method of managing the vulnerability and the sanitization methods in one embodiment of the present disclosure.

FIG. 2 shows examples of knowledge associated with sample patterns, with which the system and method of the present disclosure may deduce hints about potential vulnerability uncovered in the computer program or code.

FIG. 4 illustrates how the system may maintain the security review information during code rewriting.

DETAILED DESCRIPTION

Figure 3:
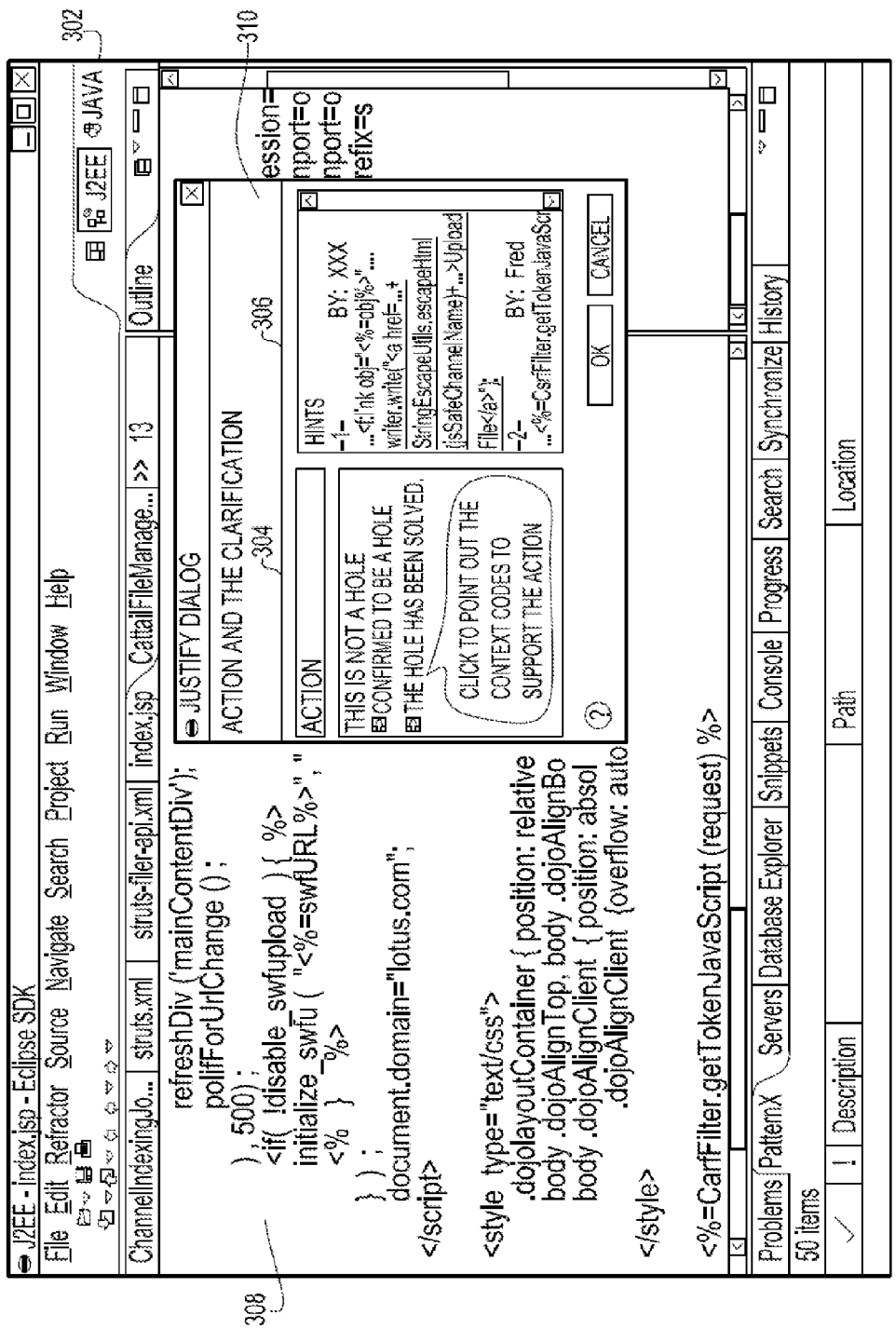
FIG. 3 shows a user interface screenshot that presents potential vulnerability found in the code and possible fixes in one embodiment of the present disclosure.

The present disclosure in one aspect provides a system and method to help developers write secure code by reviewing hints from existing hole and/or sanitization good practices. The method according to one embodiment of the present disclosure may include detecting a code instance that matches a vulnerability pattern; generating, using a processor, one or more hints associated with the code instance in response to the detecting; retrieving an action response to the code instance that matches a vulnerability pattern; and associating the retrieved action response with the code instance. The retrieving step may further include receiving context related to the action response; storing association of the context and the action response, position of the code instance, and the context; and in response to the context being changed, reassessing the association and alerting to modify the action response. The context may include one or more locations where vulnerability is mitigated.

A hole or a security hole herein refers to the application vulnerability that may result from improper code programming, which can be subject to exploiting by hackers. A hint herein refers to the security programming knowledge concluded from previous best practices. As an example, for a <%=display content %> section in the .jsp page (shown for example in FIG. 3), if the display content is directly from user input "Userinput," it has a possibility of cross-site scripting hole. The best practices in such example case could be to validate the Userinput before putting as display content like: <%=IsSafe(Userinput)%>.

For example, the system and method of the present disclosure may track and analyze the in-development code modifications. In-development analysis refers to the analysis being performed during the code development, i.e., during the writing of the code, rather than performing the analysis after the code is developed. The system and method of the present disclosure may provide in-development management of the discovered holes (i.e., potential vulnerability in the code) and the corresponding sanitization locations. The system and method of the present disclosure also may generate adaptive hints with the accumulated knowledge to assist the developers in fixing the later holes. Adaptive hints refer to the hints that are based on the context, e.g., including code similarity to the hints-associated codes, author relationship, and project relationship, any existing fixes in other nodes of the execution chain, etc. Compared to traditional tools, which only detect the vulnerability and fully rely on developers to fix the hole and close the vulnerability ticket, the system and method of the present disclosure not only may detect the vulnerability, but also associate it with the mitigation actions under the development contexts. Using this knowledge, the system and method of the present disclosure in one embodiment can evolve its capability and generate hints during the development lifecycle. The system and method of the present disclosure may also provide review and training capabilities so that developers can learn from existing best practices of others during the code development.

FIG. 1 is a flow diagram illustrating a method of managing the vulnerability and the sanitization methods in one embodiment of the present disclosure. At 102, the system in one embodiment discovers a potential vulnerability from the codes. The discovery can be based on pre-defined patterns in dynamic and/or static analysis tools. The patterns may be described in regular expression. The execution flow of the vulnerability may be also identified, for example, by static analysis.

At 104, with existing knowledge represented by sample patterns, the system deduces what hints it can provide to the developer in judging the reported vulnerability, for example, with a window to show the corresponding code snippet.

At 106, based on the decision of step 104, the system prompts the developers for actions, presenting the hints of the knowledge. The hints can be shown in an execution flow view to better navigate the programmer to the vulnerability sink and the mitigation approach. There may be more than one developer, considering the mitigation can be performed in various phases along the execution flow. In such cases, the developers are enabled to synchronize with others' actions to avoid conflict sanitization. For instance, for synchronizing, the developer may check whether the same hole has been fixed in the execution chain by other developers, and decide whether the developer should take action to fix. E.g., if one developer already encodes the user input to avoid cross-site scripting attack when storing into the database, the UI developer who uses this user input for web page display should not duplicate encoding the user input.

The actions, for which the developers may be prompted, may include but are not limited to the following. The developer may clarify that the hole (i.e., identified vulnerability in the code) is a false alarm, for instance, by entering an appropriate input or response. The developer may acknowledge that it is a hole but that is has been fixed, for example, pointing the location Uniform Resource Identifiers (URI) of the sanitization code or codes to the system. The developer may confirm that it is a hole and fix it, for instance, by proceeding to step 108.

At 108, if applicable, the system allows the programmer to fix the hole and point to the system the location URI of the sanitization codes, for example, "file: input.jsp, method: sanitizeSQL( ), hashvalue". The system may also record the name of the method and may be validate it periodically for consistency. Another approach is to store codes in a structural way that can help store the accurate hole and/or sanitization code locations. The system then stores the association of the current hole and the location of the mitigation codes. The developers or the like may also decide to cancel the decision for actions.

At 110, security experts and/or authors or the like may decide whether to add this mitigation case into the sample pattern for generating hints for future developers. If the case is to be stored, the system stores that pattern for the future hint deduction at 112. If not, the method may proceed to step 104, where more hints may be deduced from the code. If there are no more to hints to provide, or the development phase is done, or the user exits the procedure, the method stops.

Combining with above description, for in-development vulnerability response management, storing an association between the action response and the vulnerability pattern in a database, wherein the action response may include at least one of doing nothing, adding code to the code instance, and modifying the code instance, wherein the detecting may be accomplished using static analysis of the code.

FIG. 2 shows examples of knowledge associated with sample patterns, with which the system and method of the present disclosure may deduce hints about potential vulnerability uncovered in the computer program or code. In the case shown in FIG. 2, the vulnerable execution flow overlaps with an existing sanitized flow. Each path has an execution flow comprising several phases. Briefly, an execution flow can refer to a flow across the whole program or part of it. The previous sanitization method (e.g., with the corresponding codes) can be suggested to the counterpart location in the same phase as a hint. The example shown in FIG. 2, illustrates an execution flow path in a web program, including input phase, database (DB) access phase, and Web page display phase. The previously stored or saved code includes the input phase code 202, DB access phase code 204, and Web page display phase code 206. The current code under development and monitoring includes the input phase code 208 and the same DB access phase code 204, and the same Web page display phase code 206. In the previously stored or saved code, sanitization was performed as shown at 210, sanitizing the codes between 202 and 204 Since the user input collected from the phase code 208 will be served to or used by the same destination code 204 in the overlapped execution flow, the system and method of the present disclosure may decide to suggest the same sanitization method 210 for fixing the vulnerability in the codes 208 to 204. Thus, the sanitization to be performed 212 may be the same as 210.

Another knowledge example may be the case in which the syntax or type or the like, of the vulnerable codes is the same as the sample patterns. For example, both have concatenating SQL queries with tainted input. In this case, the previous vulnerability case and the sanitization codes that match the current case may be shown in an execution flow view. For example, the below example shows the stored vulnerability case (previous vulnerability case) and its sanitization location:
Stored: "SELECT * FROM users WHERE login="' '+formusr+' "AND password="' '+formpwd+' " ";
Current: "SELECT*FROM id WHERE LOGIN="' '+userinput+' " ";

Yet another example of knowledge may be the case in which there is already an existing sanitization along the flow. The system can be configured whether or not to ask the developers again. For some cases, if a security expert wants to review the effectiveness of the sanitization, he can choose to show the existing sanitizations. Another example scenario may the case in which another developer responsible for other phases in the execution flow may want to check if there is any conflict in sanitization. For example, the system may be configured to default to only showing the sanitizations to the related programmers (e.g., in the same execution flow), but if for example a security expert is performing a code review, that security expert may also choose to view the sanitizations even if the security expert is not related to or associated with the author.

Potential vulnerability in the code may be deduced in other ways. For example, reinforcement learning can be used to train an optimal deduction strategy. The author responsible for the mitigation codes in that hint (i.e., potential vulnerability uncovered in the code) may be shown to the developer for reference. The author information may be retrieved from source control or bug tracking systems. If there are many hint cases, the system can prioritize them, according to the security reputation of the authors, the relevance of the hints cases, the relationship of the execution flow, etc., i.e., one or more hints may be prioritized. The one or more hints may be prioritized according to one or more of a reinforcement learning algorithm, an author reputation, or combinations thereof, and the one or more hints may be identified using a reinforcement learning algorithm.

In another aspect, a social reputation system in collaborative development environment may be provided. For example, the system can accumulate history of activities performed by different developers and derive reputation of developers. The priority, which indicates the repeating coding style of the same person, can also be increased if the author of the sample pattern is the same as the current developer, which indicates the repeating coding style of the same person.

FIG. 3 shows a user interface screenshot that presents potential vulnerability found in the code and possible fixes in one embodiment of the present disclosure. The system and method of the present disclosure may operate in conjunction with a development environment tool 302 such as Eclipse™ tool or another integrated development environment (IDE) tool. While the programmer or the like is developing the code, for instance, via an editor 308 of the tool 302, the dialog 310 or the like window may pop up showing uncovered potential vulnerability in the code 306, and action items 304 the user can select in response to the hints of the vulnerability in the code. The hints may include information stored as a result of previous developer's input, and the hints can be provided as a hyperlink click-through that enables navigating to the associating codes. The hints may be deduced from execution flow information in the code instance and previously stored sample codes.

Figure 4:
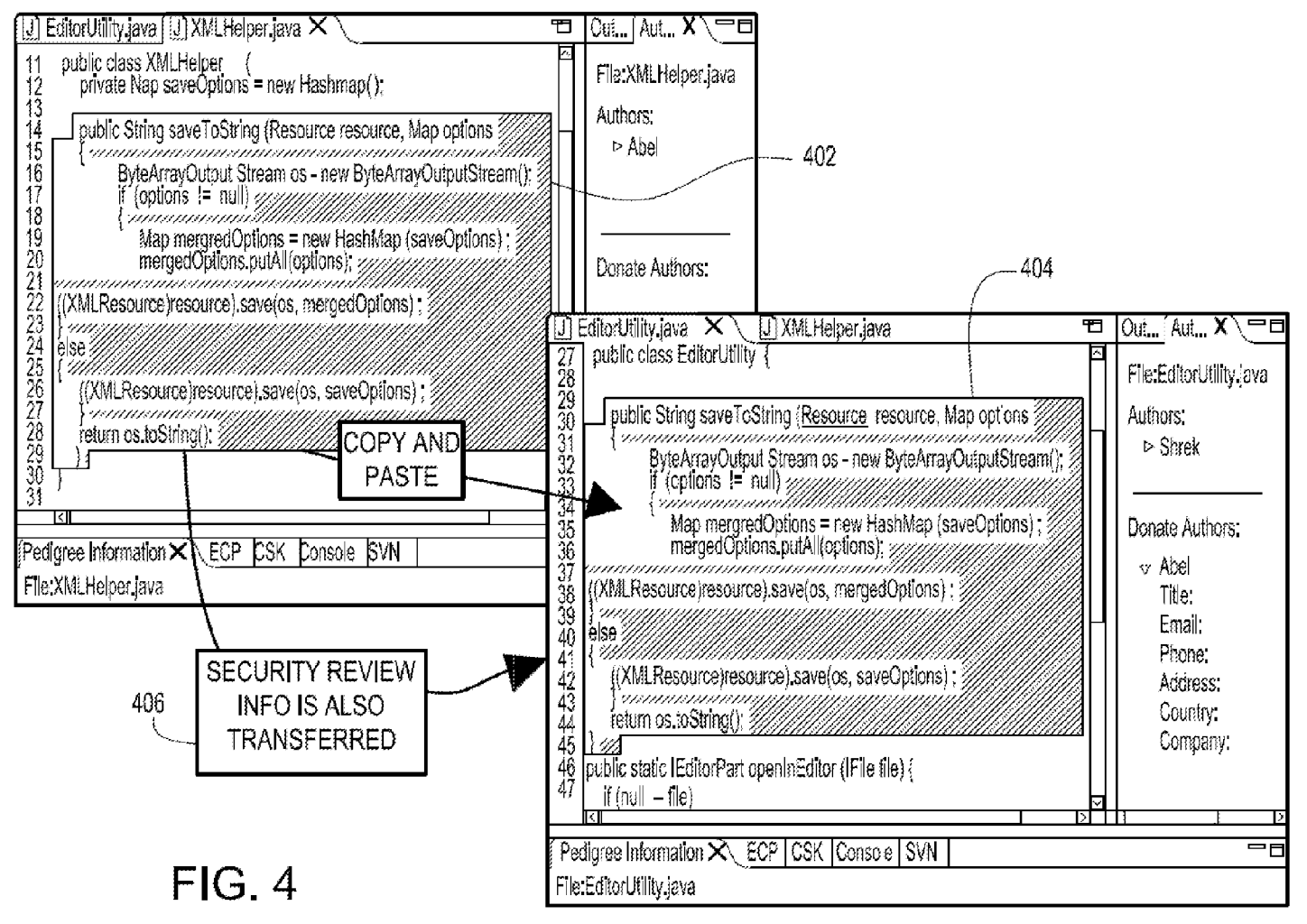

FIG. 4 illustrates how the system may maintain the security review information during code rewriting. When a code snippet 402 is copied and/or pasted to another program 404, some related security review information 406 also may be transferred to the new program 404 for the potential security hints generation.

Figure 6:
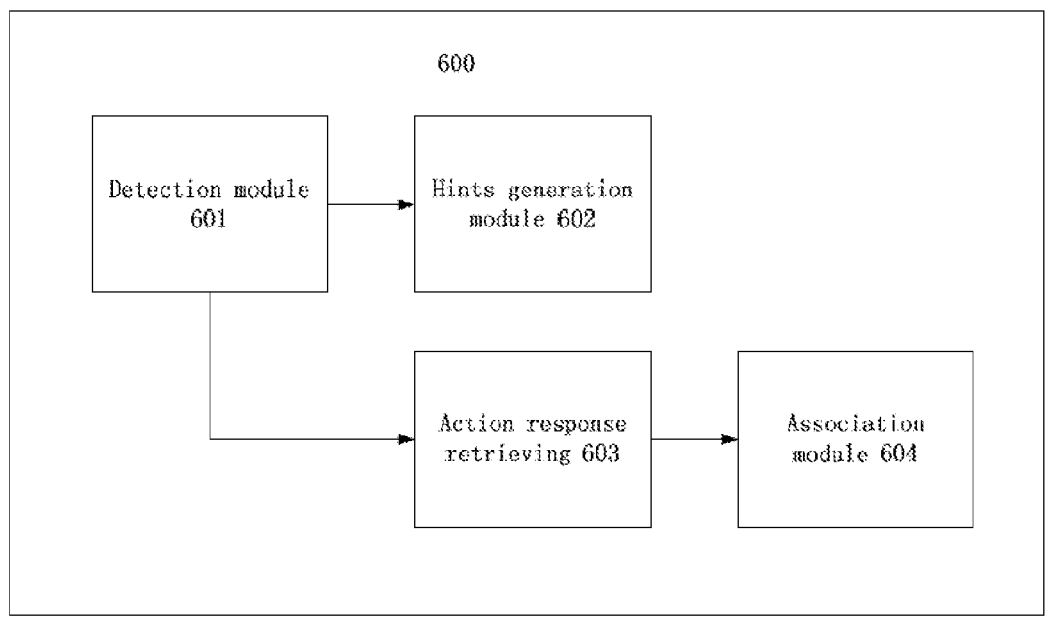
FIG. 6 illustrates a system for in-development vulnerability response management in one embodiment of the present disclosure.

FIG. 6 illustrates a system for in-development vulnerability response management in one embodiment of the present disclosure. The system may include detection module 601 operable to detect a code instance that matches a vulnerability pattern; hints generation module 602 operable to generate one or more hints associated with the code instance in response to detecting the code instance that matches a vulnerability pattern; action response retrieving module 603 operable to retrieve an action response to the code instance that matches a vulnerability pattern; and association module 604 operable to associate the retrieved action response with the code instance.

The system in one embodiment of the present disclosure further may include a database operable to store an association between the action response and the vulnerability pattern. The system further may include a user interface module operable to provide the one or more hints as a hyper-link click-through that enables navigating to the associating codes. The action response retrieving module 603 may be further operable to receive context related to the action response, store association of the context and the action response, position of the code instance, and the context, and in response to the context being changed, reassess the association. The user interface module may be further operable to provide an alert to modify the action response.

The context may include one or more locations where vulnerability is mitigated. The system further may include deducing module operable to deduce the one or more hints from execution flow information in the code instance and previously stored sample codes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
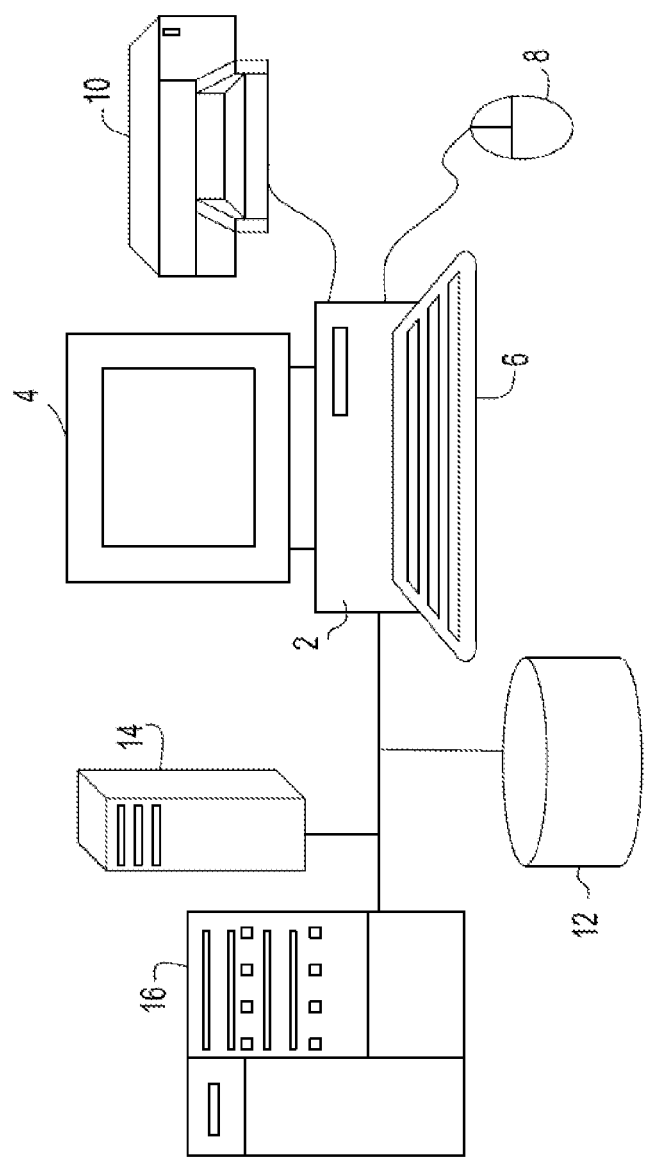
FIG. 5 illustrates an example of a computer system, in which the systems and methodologies of the present disclosure may be carried out or executed.

Referring now to FIG. 5, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for in-development vulnerability response management, comprising:
   detecting a code instance that matches a vulnerability pattern, the detecting done during a development stage of writing the code instance;
   generating, using a processor, one or more hints associated with the code instance in response to the detecting;
   providing the one or more hints on a user interface via which the code instance is being written;
   retrieving an action response to the code instance that matches a vulnerability pattern; and
   associating the retrieved action response with the code instance,
   wherein the one or more hints comprise one or more fixes in one or more sanitization locations, at least one of said one or more sanitization locations being in an execution flow of a previously stored sample code, and said one or more hints being adaptive hints that are based on context,
   wherein the one or more fixes are prioritized according to reputation of authors that created the one or more fixes,
   wherein the action response comprises performing said one or more fixes, to mitigate vulnerability of the code instance.

2. The method of claim 1, further including:
   storing in a database, an association between the action response and the vulnerability pattern.

3. The method claim 1, wherein the action response includes at least one of adding code to the code instance, and modifying the code instance.

4. The method of claim 1, wherein the detecting is accomplished using static analysis of the code.

5. The method of claim 1, wherein the one or more hints include information stored as a result of previous developer's input.

6. The method of claim 1, where the one or more hints can be provided as a hyper-link click-through that enables navigating to the associating codes.

7. The method of claim 1, where the step of retrieving further includes:
   receiving the context related to the action response;
   storing association of the context and the action response, position of the code instance, and the context; and
   in response to the context being changed, reassessing the association and alerting to modify the action response.

8. The method of claim 7, wherein the context includes one or more locations where vulnerability is mitigated.

9. The method of claim 1, further including:
deducing the one or more hints from execution flow information in the code instance and previously stored sample codes.

10. The method of claim 1, wherein the one or more hints are further prioritized according to one or more of a reinforcement learning algorithm.

11. The method of claim 1, wherein the one or more hints are identified using a reinforcement learning algorithm.

12. A system for in-development vulnerability response management, comprising:
a processor;
detection module operable to detect a code instance that matches a vulnerability pattern, the detecting done during a development stage of writing the code instance;
hints generation module operable to generate one or more hints associated with the code instance in response to detecting the code instance that matches a vulnerability pattern, the one or more hints provided on a user interface via which the code instance is being written;
action response retrieving module operable to retrieve an action response to the code instance that matches a vulnerability pattern; and
association module operable to associate the retrieved action response with the code instance,
wherein the one or more hints comprise one or more fixes in one or more sanitization locations, at least one of said one or more sanitization locations being in an execution flow of a previously stored sample code, said one or more hints being adaptive hints that are based on context,
wherein the one or more fixes are prioritized according to reputation of authors that created the one or more fixes,
wherein the action response comprises performing said one or more fixes, to mitigate vulnerability of the code instance.

13. The system of claim 12, further including:
a database operable to store an association between the action response and the vulnerability pattern.

14. The system of claim 12, further including a user interface module operable to provide the one or more hints as a hyper-link click-through that enables navigating to the associating codes.

15. The system of claim 14, where the action response retrieving module is further operable to receive the context related to the action response, store association of the context and the action response, position of the code instance, and the context, and in response to the context being changed, reassess the association, and the user interface module is further operable provide an alert to modify the action response.

16. The system of claim 15, wherein the context includes one or more locations where vulnerability is mitigated.

17. The system of claim 12, further including hints deducing module operable to deduce the one or more hints from execution flow information in the code instance and previously stored sample codes.

18. A non-transitory computer readable storage medium storing a program of instructions executable by a machine to perform a method of in-development vulnerability response management, comprising:
detecting a code instance that matches a vulnerability pattern, the detecting done during a development stage of writing the code instance;
generating, using a processor, one or more hints associated with the code instance in response to the detecting;
providing the one or more hints on a user interface via which the code instance is being written;
retrieving an action response to the code instance that matches a vulnerability pattern; and
associating the retrieved action response with the code instance,
wherein the one or more hints comprise one or more fixes in one or more sanitization locations, at least one of said one or more sanitization locations being in an execution flow of a previously stored sample code, said one or more hints being adaptive hints that are based on context,
wherein the one or more fixes are prioritized according to reputation of authors that created the one or more fixes,
wherein the action response comprises performing said one or more fixes, to mitigate vulnerability of the code instance.

19. The computer readable storage medium of claim 18, further including:
storing in a database, an association between the action response and the vulnerability pattern.

20. The computer readable storage medium of claim 18, wherein the action response includes at least one of adding code to the code instance, and modifying the code instance.

21. The computer readable storage medium of claim 18, wherein the detecting is accomplished using static analysis of the code.

22. A method for in-development vulnerability response management, comprising:
detecting a code instance that matches a vulnerability pattern, the detecting done during a development stage of writing the code instance;
generating, using a processor, one or more hints associated with the code instance in response to the detecting;
providing the one or more hints on a user interface via which the code instance is being written;
retrieving an action response to the code instance that matches a vulnerability pattern; and
associating the retrieved action response with the code instance,
wherein the one or more hints comprise one or more fixes in one or more sanitization locations, at least one of said one or more sanitization locations being in an execution flow of a previously stored sample code, and said one or more hints being adaptive hints that are based on context,
wherein the action response comprises performing said one or more fixes that mitigate vulnerability of the code instance.

* * * * *